July 4, 1961

N. M. COOKE ET AL 2,991,458

IGNITION INTERFERENCE ALARM

Filed July 27, 1956

INVENTORS
NELSON M. COOKE
FREDERICK E. BARLINE

BY Strauch, Nolan & Neale

ATTORNEYS

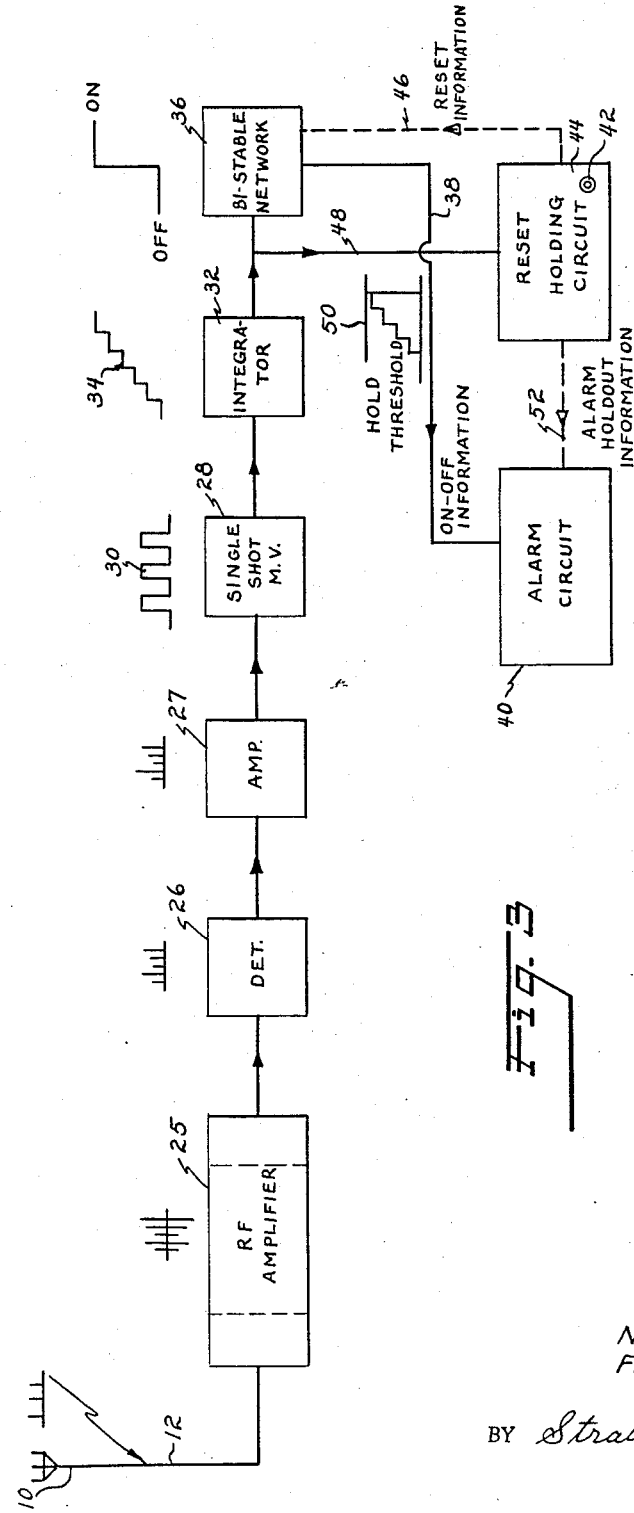

July 4, 1961 N. M. COOKE ET AL 2,991,458
IGNITION INTERFERENCE ALARM
Filed July 27, 1956 3 Sheets-Sheet 3
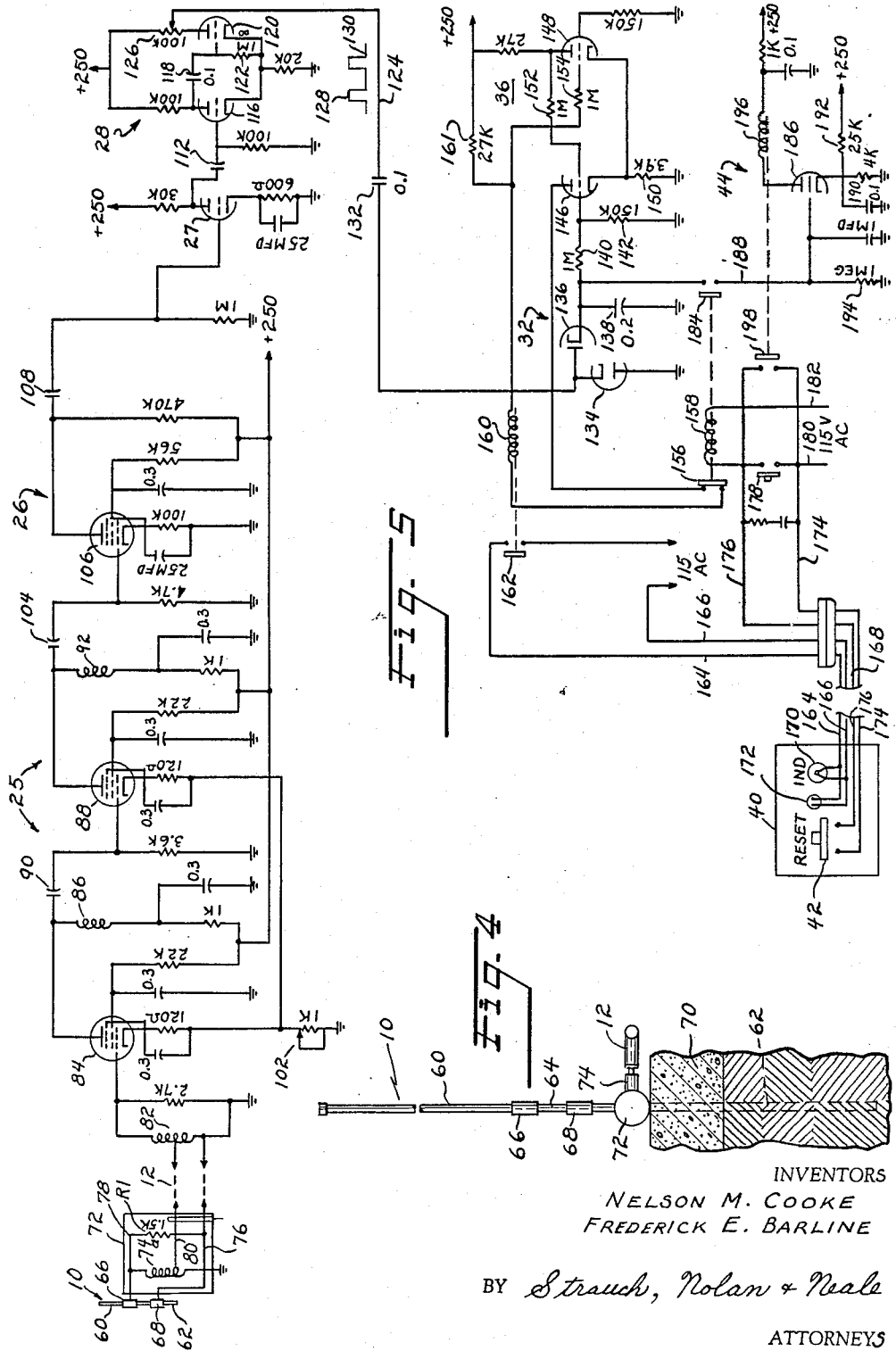
INVENTORS
NELSON M. COOKE
FREDERICK E. BARLINE
BY Strauch, Nolan & Neale
ATTORNEYS

United States Patent Office 2,991,458
Patented July 4, 1961

2,991,458
IGNITION INTERFERENCE ALARM
Nelson M. Cooke, Vienna, Va., and Frederick E. Barline, Kensington, Md., assignors to Cooke Engineering Company, Alexandria, Va., a corporation of Delaware
Filed July 27, 1956, Ser. No. 600,567
5 Claims. (Cl. 340—248)

This inventtion relates to methods and apparatus for detecting radiation and more particularly to equipment for producing an indication responsive to radiation produced by the ignition of an internal combustion engine.

For many years it has been recognized that the operation of ignition-type internal combustion engines causes an electromagnetic disturbance which can be detected by radio sets when tuned over a wide range of frequencies. This disturbance has greater amplitudes at frequencies higher than those used for broadcast purposes and, unfortunately, is greatest in the band used for communications. When communications equipment is operating within the sphere of influence of such radiation from a vehicle, the clarity of the output of the communications equipment is greatly reduced due to interference caused by radiation from the internal combustion engine ignition.

Many methods and devices have been developed for suppressing the interference from a vehicle. Prior to the present invention, however, the measurements used to determine the magnitude of the interfering ignition radiation, or the amount of reduction obtained by certain interference suppression techniques, has been a complicated process requiring the services of skilled technicians and expensive measurement devices.

It is a principal object of the present invention to provide an ignition radiation detection device which responds to a wide range of frequencies where, through investigation, it has been found that most vehicles radiate the greatest amount of energy and which can be operated by unskilled persons.

Another object of the present invention is to provide a novel method for detecting ignition interference radiation, and for indicating the presence of vehicles producing ignition radiation.

A further object of this invention is to provide an ignition radiation detection installation wherein all circuits tend to be responsive to ignition interference radiation and discriminate against other types of radiation.

Still another object of the invention is to provide a novel ignition radiation detection device for actuating an alarm in response to radiation above a predetermined level.

A still further object of the invention is to provide an ignition radiation alarm that is extremely easy to operate, requiring only that a reset button be actuated once the alarm has been triggered by a vehicle, and once the alarm has been triggered and reset, the alarm will not be triggered again by the same vehicle while continuously operating in the vicinity of the device. As a further feature after the vehicle is driven away, the device automatically resets itself in readiness for the next vehicle.

These and other objects of the invention will be more fully apparent from the appended claims, and as the description proceeds in connection with the accompanying drawings wherein:

FIGURE 3 is a block diagram of the system in accordance with the present invention;

FIGURE 4 is a detailed view of the antenna installation of FIGURE 1; and

FIGURE 5 is a detailed circuit diagram of the block diagram shown in FIGURE 3.

Figure 1:
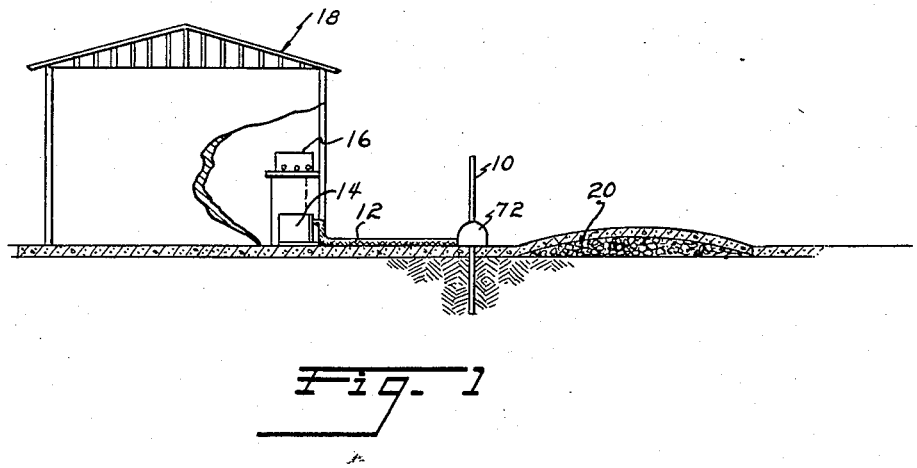
FIGURE 1 illustrates a typical installation of the novel ignition interference alarm in a roadside structure such as a gate house or guard sentry box in accordance with the present invention.

Referring now to FIGURE 1, the ignition interference alarm is illustrated as being installed at an entrance gate to an activity having equipment sensitive to internal combustion ignition radiation. The ignition interference alarm installation comprises an antenna 10, shielded transmission line 12, receiver unit 14 and an alarm and remote reset button unit 16. Receiver 14 and remote unit 16 are adapted for installation in any convenient location, as for example in or near a sentry box or gate house 18 with antenna 10 installed in close proximity to roadway 20. The remote unit 16 containing the alarm and reset button may be installed in any location easily accessible to the sentry or guard on duty either inside or outside guard house 18. Antenna 10, shown in greater detail in FIGURE 4, is effectively a vertical stub or probe type antenna mounted along the side of roadway 20 and is connected by a transformer in junction box 72 to the shielded transmission line 12. Antenna 10 is preferably mounted to be within five feet of the side of vehicles passing on roadway 20.

Figure 2:
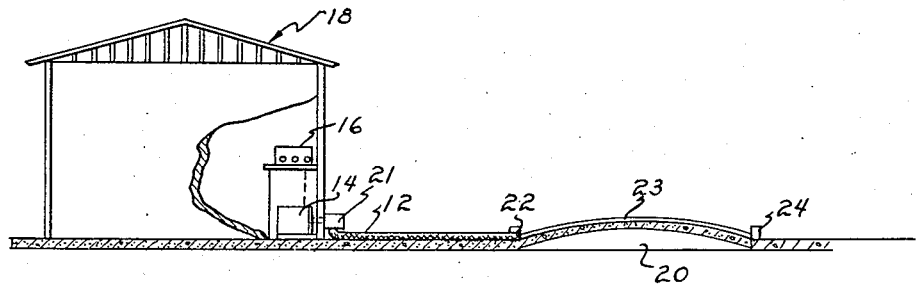
FIGURE 2 is a view of similar installation with a modified antenna.

In FIGURE 2, the installation there illustrated contains a similar shielded cable 12, receiver 14 and indicator 16. Junction box 21 is mounted close to the earth adjacent receiver 14 and at one end of shielded cable 12. The other end of the shielding on cable 12 extends to roadway 20. At edge 22 of roadway 20, the shielding is removed and just the bare center conductor 23 extends across roadway 20 to a stake 24 of wood or other insulating material. A similar stake or support may be used at edge 22 of the roadway to assure that the long antenna wire 23 remains tight across the surface of roadway 20 so that cable 12, including the center conductor 23, are not moved by traffic. A small groove or recess (not shown) extending across the surface of roadway 20 into which wire 23 is laid may be provided. The shielding on shielded transmission 12 is in good contacting relation with the earth to provide a suitable ground for the antenna.

Referring now to FIGURE 3, there is illustrated a block diagram of the system in accordance with the present invention. Antenna 10 is connected to a radio frequency receiver comprising an RF amplifier 25 and detector 26. The interference radiation produced by an internal combustion engine consists of pulses of radio frequency energy of widely varying width and magnitude which are fed from detector 26 to voltage amplifier 27, and then to single shot multivibrator 28. Multivibrator 28 produces pulses of uniform width, or time duration and amplitude as illustrated at 30 thereby converting the irregular pulses emanating from the internal combustion engine ignition into a series of substantially identical pulses occurring at intervals determined in general by the speed and number of cylinders in the engine. The output from multivibrator 28 is fed to integrator circuit 32, the voltage level of which increases with each pulse received from multivibrator 28 as represented by the stepped waveform 34. When the voltage level at the output of integrator circuit 32 increases to a predetermined level, bi-stable network 36 transfers from its normal condition to an alternate condition to supply a signal through lead 38 effective to energize the indicator in alarm circuit 40. The indicator in alarm circuit 40 remains energized regardless of the continued presence of ignition interference until reset button 42 in reset holding circuit 44 is manually closed.

When reset button 42 is depressed, a circuit is energized to transmit a signal from reset holding circuit 44 as indicated by dotted line 46 to bi-stable network 36 to thereby de-energize the indicator in alarm circuit 40 even though the interference ignition energy is still being received. Reset holding circuit 44 remains energized by the voltage level from integrator circuit 32 through lead 48 so long as the integrator circuit voltage level remains above the "hold thresh-hold" voltage level 50 which is slightly less than the voltage level necessary to trigger bi-stable network 36.

A further function of reset holding circuit 44 is to supply information on lead 52 preventing re-energization of the indicator in alarm circuit 40 so long as interference radiation is continuously received during the period when reset holding circuit 44 remains energized. This function of reset holding circuit 44 is particularly useful in installations as illustrated in FIGURES 1 or 2 where an audible indicator is included in alarm circuit 40 because after the audible alarm is turned off by pressing reset button 42 the guard is able to converse with the driver of the vehicle producing the ignition interference without the indicator again becoming energized by alarm circuit 40. A further desirable feature resides in the automatic de-energization of reset holding circuit 44. As the vehicle producing the interference radiation drives away, the voltage level at the output of integrator 32 decreases whereby reset holding circuit 44 automatically becomes ineffective thus placing the equipment in readiness for the next vehicle without further manual intervention.

Referring now to FIGURE 4, the details of a preferred form of the antenna are illustrated. After testing a large number of different types of antennas, it has been found that the most satisfactory antenna may be constructed of two pipe sections, 60 and 62 each three feet in length, and formed of three-quarter inch galvanized iron pipe. Sections 60 and 62 of antenna 10 are connected together by intermediate section 64 of insulating material by means of sleeves 66 and 68. The lower section 62 of pipe provides the antenna ground and is preferably installed at a depth adequate to provide a good ground connection. Earth should be tapped firmly around the lower pipe section, and a layer of cement 70, no greater than one foot deep may be used to provide better rigidity if desired.

A waterproof junction box 72 is supported on lower section 62 of antenna 10 preferably at a position which just touches the ground. Junction box 72 contains a coaxial cable connection 74 for receiving one end of shielded cable 12, which for example may be a coaxial transmission line, connecting antenna 10 to receiver 14.

Referring now to FIGURE 5 the electrical circuit connection from the antenna to the receiver is illustrated. Inside junction box 72 is an antenna matching transformer composed of a slug tuned inductor 74a which may have a center frequency of for example 18 megacycles and a parallel resistor R1 connected at one end to lead 76 which is grounded and at the other end to lead 78 connected to ungrounded section 60 of antenna 10. Lead 80 is connected to a tap on inductance 74a and forms the center or ungrounded conductor of transmission line 12 which is connected at its other end to slug tuned inductance 82 in the grid circuit of tube 84. Inductor 82 is preferably similar to inductor 74a in the impedance matching transformer and may have a center frequency of 18 megacycles.

In the plate circuit of tube 84 a third slug tuned inductor 86 is utilized having a lower center frequency, as for example 15.8 megacycles, to provide a tuned plate circuit and the output signal is coupled to RF amplifier stage 88 by capacitor 90. The plate circuit of tube 88 contains a further slug tuned inductor 92 which may for example have a center frequency of 20 megacycles thereby providing a wide band amplifier having a double-humped curve with one peak at about 16 megacycles, another peak at about 20 megacycles and a slight dip at about 18 megacycles. This provides an amplitude response curve with the 0.707 points approximately 5 megacycles apart which corresponds with a band of frequencies where the amplitudes of the ignition interference radiation have been found to be even greater than the amplitudes at standard broadcast frequencies, and accordingly at the band where a greater harmful effect is produced when the vehicle is operated in the proximity of communications equipment. The present invention is thus capable of indicating the effectiveness of ignition noise suppression devices at the frequency which causes the undesirable interference.

The gain of RF amplifier 25 in the illustrated embodiment is controlled by a variable common cathode resistor 102 for tubes 84 and 88 and the output from tube 88 is connected by capacitor 104 to detector stage 26.

Tube 106, by virtue of the large cathode resistance and capacitor, serves as a plate detector and is effective to detect the signal output of radio frequency amplifier 25 and provide additional signal amplification. The output signal from tube 106 is coupled by capacitor 108 to the input grid of voltage amplifier tube 27. The output signal from voltage amplifier 27 is connected by capacitor 112 to single shot multivibrator 28 which may be of conventional construction having the usual common cathode resistance and a capacitor 118 connected between the plate of tube 116 which is normally non-conducting and the grid of normally conducting tube 120 and resistor 122 with the relative values of capacitors 118 and resistor 122 controlling the time tube 116 conducts after being triggered on by a positive signal through capacitor 112 to determine the width of the output pulses. In operation, any positive pulse above a predetermined amplitude from capacitor 112 is effective to trigger tube 116 into conduction thereby causing conduction in tube 120 to cut off. As capacitor 118 discharges through resistor 122, the potential on the grid of tube 120 gradually increases and eventually causes tube 120 to begin conduction and cut off conduction in tube 116. The resulting output signal on lead 124 from resistor 126 in the plate circuit of tube 120 is a positive going pulse, the duration of which is determined by the discharge time of capacitor 118 through resistor 122. The values of capacitor 118 and resistor 122 are preferably selected so that a reasonably wide pulse width is obtained for providing reliable and uniform operation of the integrating circuit. The actual pulse width is relatively unimportant so long as each pulse is uniformly of the same width where a quantitive measure of the ignition radiation is required. Similarly, the actual amplitude of the pulse on lead 124 is relatively unimportant so long as uniformity is provided. The upper level 128 of the square wave corresponds to the power supply voltage while the lower level 130 of the square wave is determined by the position of the potentiometer arm on resistance 126 in the plate of tube 120. Thus the amplitude of the square waves on lead 124 may be varied from zero to a maximum by control of the potentiometer arm along resistance 126.

A control of the size of the uniform pulses on lead 124 may be provided by adjusting the size of resistor 122 to regulate the width or as illustrated by the adjustable tap on resistance 126 to regulate the amplitude. Control of the amplitude is preferred in the illustrated embodiment because of the nature of the integrating circuit next described, and is preferably set at the factory since optimum pulse size is determined principally by the input circuit parameters of tubes 146 and 186.

The square wave signal on lead 124 is connected through capacitor 132 to a clamper circuit composed of diode 134 which is effective to prevent negative signal components from appearing at the plate of integrator diode 136 and thus establish a ground reference voltage for charging capacitor 138 in the integrator circuit.

The integrator circuit may be of a conventional type and as illustrated consists of diode rectifier 136, storage capacitor 138 and a charging circuit including resistances 140 and 142. During the positive going portions of the square wave signal on lead 124, capacitor 138 is charged through diode 136 and resistors 140 and 142 thereby causing the voltage across storage capacitor 138 to increase in a step by step manner. The values of capacitor 138 and resistors 140 and 142 are selected so that the time constant of the circuit through which capacitor 138 discharges is adequately long compared to the period between successive pulses produced by the ignition of an internal combustion engine so that the voltage across capacitor will not discharge significantly between successive pulses but will discharge completely in the matter of a second or less once multivibrator 28 is no longer triggered.

Bi-stable circuit 36 is of conventional construction, and as illustrated is composed of triode sections 146 and 148 having a common cathode resistance 150 and crossed plate to grid connections by resistors 152 and 154. Tube 148 is normally conducting when no signal is received on antenna 10. A voltage proportional to the voltage on capacitor 138 is applied to the grid of tube 146 from the ungrounded end of resistor 142 to trigger tube 146 on when a predetermined voltage level at the cathode of tube 136 is reached. The plate circuit of tube 146 is connected to normally closed contacts 156 associated with relay coil 158 and through relay coil 160 and resistor 161 to B+.

Normally open contacts 162 are closed by the energization of coil 160 to apply suitable voltage through conductors 164 and 166 which extend through a cable 168 to indicator light 170 in alarm unit 40. Socket 172 may also be provided in parallel with light 170 for energization of an audible indicator where desired.

Reset button 42 is connected by leads 174 and 176 to parallel reset button 178 which is provided on the receiver unit chassis so that the closing of either reset button 42 or 178 is effective to apply operating power from leads 180 and 182 to relay coil 158.

Switch contacts 184, also controlled by the energization of relay coil 158, are effective when closed to connect the grid of tube 186 to the cathode of integrator tube 136 through lead 188. The cathode of tube 186 is connected to a voltage divider network including resistor 190 connected to ground and resistor 192 connected to B+ which provides a positive bias voltage relative to the grid which is connected through resistance 194 to ground thereby assuring tube 186 is normally non-conducting. Relay coil 196 in the plate circuit of tube 186 is accordingly de-energized thereby holding switch contacts 198 open as illustrated.

In operation, positive pulses on lead 124 cause step charging of capacitor 138 thus gradually increasing the voltage level applied to the grid of tube 146. The number of reoccurring pulses on lead 124 necessary to increase the voltage level on the control grid of tube 146 to cause it to begin conduction is controlled by the adjustment of the slider on resistance 126 which determines the amplitude of the pulses on lead 124. Once tube 146 begins to conduct, a steady state maximum current flow is immediately reached which is adequate to energize relay coil 160 thereby closing contacts 162 and energizing indicator 170 and alarm socket 172 in remote unit 40. The circuit will remain in this condition indefinitely until either reset button 42 in the remote unit or reset button 178 in the receiver unit is pressed.

In normal operation, reset button 42 is depressed by an attendant at the guard station thereby energizing coil 158 from a fixed voltage source through leads 180 and 182 thus transferring switch contacts 156 and 184. Opening of switch contacts 156 breaks the plate circuit of tube 146 thereby de-energizing relay coil 160 and opening contacts 162 to de-energize the indicators in alarm unit 40. When conduction in tube 146 is broken, conduction through tube 148 starts immediately due to the positive impulse applied to grid of tube 148 through resistor 154 coupled with the decrease in cathode potential.

If switch contacts 156 were permitted to close upon release of a reset button, tube 146 would again immediately begin to conduct so long as the source of interference ignition energy remains in the vicinity of the antenna. This is objectionable first because an audible alarm is in many cases desirable and the guard or sentry at the guard house ordinarily will discuss the matter with the driver of the interfering vehicle and give special parking instructions. Second, the entire equipment cannot be reset to a condition to test the next vehicle until the guard is certain the vehicle producing objectionable interference has passed out of the sensitive range of the equipment or its motor otherwise turned off.

As a further feature of the present invention, when an interfering signal which has once triggered the alarm remains continuously operating in the range of the equipment after a reset button is released, the positive voltage on the ungrounded side of the storage capacitor 138 is applied through switch contacts 184 which are closed when relay coil 158 is energized and lead 188 to the grid of tube 186 to thereby cause tube 186 to become conducting. The plate current of tube 186 is effective to energize relay coil 196 thereby closing contacts 198 which are in parallel with reset buttons 42 and 178 to thus hold relay coil 158 energized so long as contacts 198 remain closed. As long as tube 186 continues to conduct, relay coil 158 remains energized through closed contacts 198 thereby holding contacts 156 open thus preventing energization of coil 160 and closing of contacts 162 which could permit re-energization of the indicators in the alarm unit.

As soon as the vehicle motor is turned off or otherwise is driven away so the received ignition pulses are no longer large enough to trigger multivibrator 28, pulses no longer appear on line 124 and the positive voltage on storage capacitor 138 discharges through resistors 140 and 142 as well as resistance 194 to ground in less than one second. The values of resistors 140 and 142 are so selected relative to the voltage causing conduction through tubes 146 and 186 that by the time conduction through tube 186 decreases to the point where relay coil 196 becomes de-energized, the voltage level applied to the grid of tube 146 is below the value necessary to trigger bi-stable circuit 36 into its condition which energizes the alarm circuit.

Thus, once the indicator has been energized by a vehicle within the sensitive range of the equipment, closing a reset button disenables the equipment so long as interference pulses above the critical amplitude are continuously received. As the offending vehicle drives away or its motor is shut down, the voltage on the cathode of integrator tube 136 gradually decreases to thus automatically restore the equipment to a condition ready for another cycle of operation.

For setting and calibrating the particular equipment as described in connection with FIGURE 5, a pulse generator may be connected to the input of single shot multivibrator 28 and arranged to provide a one microsecond pulse at a repetition rate of 100 c.p.s. In this equipment, the alarm will trigger when the pulse generator is adjusted for 30 volt amplitude output. The overall system sensitivity is tested by connecting coaxial transmission line 12 to a signal generator and with the signal generator tuned to 18 megacycles, 30 percent modulated with a frequency of 400 c.p.s., and with receiver gain control 102 set for maximum gain, the alarm should trigger with an input signal of 350 microvolts. When a reset button is then pressed, the holding circuit will hold reset relay 196 energized as the voltage output of the signal generator is slowly reduced until the voltage falls to approximately 330 microvolts.

An ignition interference alarm incorporating the principles as described above is particularly well adapted for installation at the entrance to a communications receiving center or other sensitive area to monitor all vehicles entering or leaving the site and to call the sentry's attention to all vehicles which produce interferenc radiation exceeding the maximum allowable level. The invention may also be used merely to detect the presence of ignition type vehicles by being set to an exeremely sensitive threshhold. The alarm may be used to alert a person performing other duties either at the installation or at a remote location. The invention has been found additionally very useful for maintenance activity to monitor the efficiency of interference suppression measures installed on vehicles.

Since the energy received from an automobile ignition system is formed of very narrow, repetitive pulses, the output of the voltage amplifier has essentially the same form. These pulses are fed, in accordance with one feature of the invention, to a multivibrator circuit which develops one pulse of predetermined amplitude and time duration for every input pulse it receives that is large enough to trigger it. A circuit responsive to repetitive pulses but substantially non-responsive to singly occurring pulses or transients is effective to trigger the alarm circuit. In the illustrated embodiments this last mentioned circuit is in the form of an integrator circuit which is insensitive to a single pulse or singly occurring transients and thus ineffective to energize the alarm circuit by signals other than pulses from ignition systems. Thus the equipment is unaffected by the background noise level caused by lighting or other non-repeating noise sources. Installation of the antenna so as to be at a position no greater than five feet, and preferably within three feet of the vehicle is also important for discriminating against background noise while having a sensitivity adequate to detect ignition radiation at amplitudes which interferes with communication circuits.

When the reset button is actuated, the integrator output is switched to a holding circuit which maintains the alarm circuit inoperative so long as the ignition interference signal is continuously present. As soon as the interference source is removed from the immediate proximity of the equipment, the holding circuit releases to automatically restore the system in readiness to be operated by the next interference source.

As a further feature of the present invention, the circuit is completely insensitive to ignition radiation below the level which is effective to trigger multivibrator 28. Thus the presence of a vehicle producing ignition radiation less than the level effective to trigger the single shot multivibrator coupled with singly occurring pulses will not improperly energize the alarm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a system for detecting radiation interference caused by ignition from an internal combustion engine; an indicator; circuit means including a receiver for energizing said indicator in response to ignition radiation pulses; and a reset crcuit including means for de-energizing said indicator and for disenabling said circuit means to prevent re-energization of said indicator while continuously receiving ignition radiation above a level effective to cause energization of the indicator.

2. In a system for detecting radiation interference caused by ignition from internal combustion engines: an indicator; circuit means including a receiver for energizing said indicator in response to ignition radiation pulses; a reset control including means for de-energizing said indicator; and circuit means blocking re-energization of said indicator from continuously received interference pulses made effective by operation of said reset control and rendered ineffective once interference pulses above a reference signal level are no longer received.

3. In a system for detecting radiation interference caused by ignition from an internal combustion engine: an indicator; circuit means including a receiver for energizing said indicator in response to ignition radiaton pulses above a predetermned amplitude; a manually operable reset control for de-energizing said indicator; and a reset holding circuit energized by said reset control for holding said indicator in de-energized condition until the amplitude of said ignition radiation pulses decreases to a value less than said predetermined amplitude.

4. An ignition interference alarm comprising an antenna coupled to a receiver, means responsive to the output signals from said receiver to convert pulses of varying amplitude and width present in ignition interference radiation to pulses of substantially constant amplitude and width, an indicator, and circuit means responsive to a series of said pulses of substantially constant amplitude and width for energizing said indicator, a reset control including means for de-energizing said indicator, and a reset holding circuit energized by said reset control preventing re-energization of said indicator until said pulse converting means becomes de-energized by failure to receive ignition signals from said receiver.

5. An ignition interference alarm comprising an antenna coupled to a receiver, means responsive to the output signals from said receiver to convert short, widely varying pulses present in ignition interference radiation to pulses of substantially constant amplitude and width, an integrator circuit responsive to recurring groups of said last mentioned pulses, a bi-stable circuit and an indicator energized by one condition of said bi-stable circuit, means connecting said bi-stable circuit to said integrator circuit to be triggered to its said one condition by the output of said integrator circuit, a reset control including means for transferring said bi-stable circuit to the other of its conditions, and a reset holding circuit energized by said reset control preventing transfer of said bi-stable circuit to said one of its conditions while energized, said reset holding circuit being connected to remain energized so long as the output from said integrator circuit continuously remains capable of triggering said bi-stable circuit.

References Cited in the file of this patent

UNITED STATES PATENTS

| | | |
|---|---|---|
| 2,450,166 | Rich | Sept. 28, 1948 |
| 2,472,774 | Mayle | June 7, 1949 |
| 2,492,182 | Robinson | Dec. 27, 1949 |
| 2,499,410 | Nupp | Mar. 7, 1950 |
| 2,588,879 | Richards | Mar. 11, 1952 |
| 2,652,551 | Gumperty et al. | Sept. 15, 1952 |
| 2,645,771 | Labin | July 14, 1953 |
| 2,794,974 | Bagno et al. | June 4, 1957 |